April 17, 1934.  H. O. ROOSENSTEIN  1,955,093
OSCILLATION CIRCUIT FOR ELECTRIC WAVES
Filed July 7, 1930
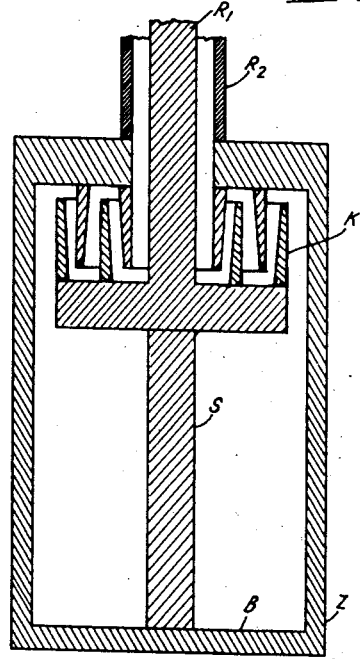
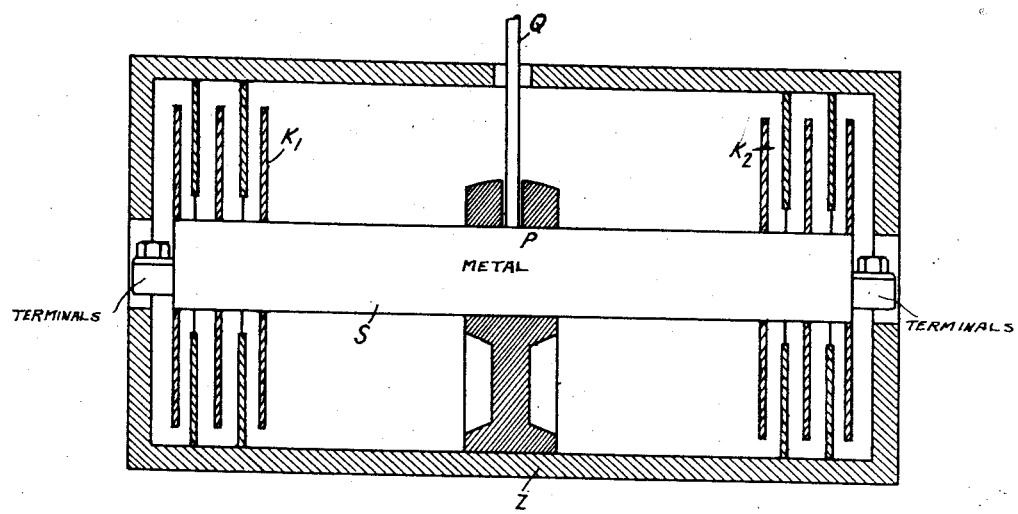
INVENTOR
HANS OTTO ROOSENSTEIN
BY
ATTORNEY Patented Apr. 17, 1934

1,955,093

UNITED STATES PATENT OFFICE 1,955,093

OSCILLATION CIRCUIT FOR ELECTRIC WAVES

Hans Otto Roosenstein, Berlin, Germany, assignor to Telefunken Gesellschaft für Drahtlose Telegraphie m. b. H., Berlin, Germany, a corporation of Germany Application July 7, 1930, Serial No. 465,947
In Germany July 6, 1929

4 Claims. (Cl. 250—36)

(Granted under the provision of section 14, act of March 2, 1927, 357 O. G. 5) REISSUED

For various technical purposes, for instance, wave-meters and for maintaining the frequency of transmitters at a constant value, oscillatory systems possessing very low damping are required. What is used therefor are electrical circuits involving feeble damping, quartz crystals, etc.

When recourse is had to circuits with low damping the radiation resistance or characteristic impedance plays a part in the case of short waves. In order to prevent such radiation of the circuit it is general practice to accommodate the circuit within a shielded box. By virtue of induction from the oscillation circuit there are then set up in the said box currents of such size, sense and phase that the electromagnetic field outside the box is almost entirely suppressed or neutralized. However, these induction currents involve losses whereby the advantage obtained is diminished.

According to this invention no currents specially produced therefor are utilized for the shielding indeed, the current flowing in the circuit itself is conducted along the shielding box in such a manner that the electromagnetic field outside the box becomes practically zero.

Figures 1 and 2 show two different embodiments of the present invention.

Fig. 1 shows an embodiment which is readily practicable in technical respect. The arrangement comprises a hollow cylinder Z consisting of metal upon the bottom surface B of which the inductance S in the form of a metallic rod is conductively fastened. A capacity K which is here shown to consist of a concentric ring condenser, completes the oscillation circuit. Terminals R1 and R2 serve for connecting the circuit to the apparatus wherein the circuit is to be used.

Owing to the concentric arrangement here resorted to, all parts are uniformly passed by the current, so that the losses are minimized.

The circuit shown in Fig. 1 is little suited for push-pull schemes for the reason that the ground capacities of the two condenser coats are of unequal size.

A modification of the arrangement which is free from this drawback is illustrated in Fig. 2. In this scheme the inductance in the form of rod S at both ends is provided with capacities K1 and K2, and it is supported at a point which often is located at the middle of the rod. At this point the rod can be mounted in a way either associated with the cylinder Z or insulated therefrom. In this latter case it is a suitable scheme in many arrangements to provide a conductive connection PQ at this point P with some other convenient circuit elements located outside the cylinder Z. What is particularly referred to here is the case where the circuit constitutes the grid circuit in a push-pull transmitter, and where the connection PQ serves for allowing the grid current to leak away.

It goes without saying that all such ways and means as are known in the prior art for cooling may be used in the circuit.

I claim:

1. An oscillatory circuit for high frequency currents comprising a hollow metallic cylinder, said cylinder being closed on all sides except for an aperture in the approximate center of one end wall of said cylinder, a condenser within said cylinder comprising a plurality of separated metallic plates, alternate ones of which are connected to the two opposite end walls of said cylinder whereby the condenser is short circuited for direct current, and an inductance in the form of a metallic rod connecting one group of said plates to one of said opposite end walls, said rod being arranged to extend through said aperture in the other opposite end wall whereby the combination of said inductance, condenser and cylinder form an oscillatory circuit for high frequency currents.

2. An oscillatory circuit for high frequency currents comprising a hollow metallic enclosed cylinder, a condenser within said cylinder comprising a plurality of separated metallic plates, alternate ones of which are connected together, one of said groups of metallic plates being connected to a wall of said cylinder, and the other group of said plates being coupled to said wall through an inductance in the form of a metallic rod, whereby the combination of said inductance, condenser and cylinder form an oscillatory circuit for high frequency currents.

3. An oscillatory circuit for high frequency currents comprising a hollow metallic enclosed cylinder, an inductance in the form of a metallic rod extending axially through the center of said cylinder, a condenser comprising a plurality of separated circular shaped plates at one end of said rod, alternate ones of which are connected together, one of said groups of circular plates being connected to the wall of said cylinder and the other group of said circular plates being connected to said metallic rod, another condenser at the other end of said rod having plates similarly connected to said rod and said cylinder, whereby the combination of said inductance, condensers and cylinder form an oscillatory circuit for high frequency currents.

4. An oscillatory circuit for high frequency currents comprising a hollow metallic cylinder, said cylinder having end walls, a condenser within said cylinder comprising a plurality of separated metallic plates, alternate ones of which are coupled to said opposite end walls of said cylinder, an inductance in the form of a metallic rod acting to directly connect one group of said circular plates to one of said walls, whereby the combination of said inductance, condenser and cylinder form an oscillatory circuit for high frequency currents.

HANS OTTO ROOSENSTEIN.